United States Patent
Korpert et al.

Patent Number: 5,339,193
Date of Patent: Aug. 16, 1994

[54] ANAMORPHOTIC ATTACHMENT FOR A PROJECTION OBJECTIVE

[75] Inventors: Heinz Korpert, Bad Kreuznach; Ralf Linn, Niedermoschel, both of Fed. Rep. of Germany

[73] Assignee: Jos. Schneider Optische Werke Kreuznach GmbH & Co. KG, Kreuznach, Fed. Rep. of Germany

[21] Appl. No.: 931,292

[22] Filed: Aug. 17, 1992

[30] Foreign Application Priority Data

Aug. 17, 1991 [DE] Fed. Rep. of Germany ....... 4127255

[51] Int. Cl.$^5$ .................. G02B 7/02; G02B 13/08
[52] U.S. Cl. ................... 359/819; 359/668
[58] Field of Search ............ 359/207, 362–363, 359/367, 399–410, 443, 446, 503–506, 668–671, 798–801, 808–812, 815–823; 381/205; 353/39–40, 71–80, DIG. 6

[56] References Cited

U.S. PATENT DOCUMENTS

| | | | |
|---|---|---|---|
| 2,940,372 | 6/1960 | Ehrenhaft et al. | 359/670 |
| 3,410,630 | 11/1968 | Jacobs | 359/668 |
| 4,978,212 | 12/1990 | Hazard | 351/205 |
| 5,250,968 | 10/1993 | Numata et al. | 359/231 |

FOREIGN PATENT DOCUMENTS

3629438  4/1988  Fed. Rep. of Germany ...... 359/668

Primary Examiner—Loha Ben
Assistant Examiner—Thong Nguyen
Attorney, Agent, or Firm—Herbert Dubno

[57] ABSTRACT

An anamorphotic attachment for a projection objective has front and rear lens groups which have vertical diameters greater than their horizontal diameters and received respectively in an inner mounting tube and an outer mounting tube, the latter being connectable to the projection objective at its rear end. The inner mounting tube is fully received in the outer mounting tube and has thereon a shifting screw for moving the inner mounting axially within the outer mounting and a clamping screw actuatable to lock the two mounting tubes together, both accessible at the front end of the inner mounting tube within the outer mounting tube.

30 Claims, 5 Drawing Sheets

ANAMORPHOTIC ATTACHMENT FOR A PROJECTION OBJECTIVE

FIELD OF THE INVENTION

Our present invention relates to an anamorphotic attachment for a projection objective and, more particularly, to an attachment of the type which comprises a front lens group and a rear lens group in a mounting which enables relative movement of the lens groups axially for the purpose of focusing.

BACKGROUND OF THE INVENTION

Anamorphotic attachments for projection objectives are intended to provide a lens system ahead of a standard projection objective to apply an anamorphotic action to the projected beam.

For the most part such anamorphotic attachments for projection objectives have comprised four or more cylindrical lenses in two or more lens groups capable of generating a two-fold anamorphotic factor in the projection process over the projection from the basic objective alone.

For this purpose, the attachment is usually fixed on the front of the projection objective and has two relatively telescopingly movable parts, a movable one of which is axially shiftable relative to the other to provide the focusing action.

Hence one of the lens groups, usually the rear lens group, is fixed with respect to the projection objective while the other lens group, usually the front lens group, is axially movable. The lenses generally have smaller horizontal dimensions than vertical dimensions.

Anamorphotic attachments are used for the reproduction of anamorphotic films, for example, 35 mm—cinemascope films, and have been constructed at high cost heretofore with relatively large external dimensions. The outer diameter of the basic objective and the outer diameter of the anamorphotic attachment in the region of this connection to the objective are usually fixed dimensions or are predetermined. For motion picture projectors, these diameters are standardized.

Consequently it has been customary to provide anamorphotic attachments which widen from their attachment to the projection objective, i.e. from the rear end of the attachment, to the front side thereof. This has been found to complicate manipulation of the projection apparatus and the attachment. Since an anamorphotic attachment must be handled, smaller external dimensions are an advantage. In the past it has been found that complex adjustment mechanisms for the movable lens group have required large-size attachments which were expensive, difficult to manipulate and of complicated construction.

Indeed, with earlier constructions, it has not been possible to provide small dimensions of an anamorphotic attachment for a projection lens and still have available the space for the adjustment mechanisms which were necessary for it.

OBJECTS OF THE INVENTION

It is, therefore, the principal object of the present invention to provide an anamorphotic attachment for a projection objective which can have an invariable relatively small set of external dimensions, high image reproduction efficiency and a simpler construction of the attachment.

Another object of this invention is to minimize the dimensions for a given anamorphotic factor of an anamorphotic attachment and ensure that a simple cylindrical external configuration of the attachment is possible.

Another object of the invention is to provide an improved anamorphotic attachment which is free from the drawbacks of the prior art systems described above.

SUMMARY OF THE INVENTION

These objects are attained, in accordance with the invention, in an anamorphotic attachment for a projection objective, especially for motion picture projection objectives which comprises:

a fixed outer elongated tubular mounting provided with means for affixing the outer tubular mounting to the projection objective at a rear end of the outer tubular mounting;

an axially movable inner tubular mounting telescopingly received in the outer tubular mounting, axially shiftable relative to the outer tubular mounting and extending substantially to a front end of the outer tubular mounting;

a front lens group mounted in the inner tubular mounting at a front end thereof and a rear lens group mounted in the outer tubular mounting at the rear end thereof and forming with the front lens group an anamorphotic projection system; and means received in a lateral region of the inner mounting and axially coupling the mountings while being actuatable at a front side of the attachment for shifting the inner tubular mounting in the outer tubular mounting.

According to the invention, the inner mounting is formed at the front end thereof with an axially extending bore rotatably receiving a shank of the screw, the screw extending rearwardly into an annular recess formed on the inner mounting, the outer mounting having an inner recess axially overlapping the annular recess of the inner mounting, the nut being provided in the inner recess.

The screw can be axially fixed to the inner mounting by a securing ring (split ring) engaging an axially central region of the screw and the screw threads of the screw and the nut can be designed as mutually tightly interfitting screw threads.

The arresting device is provided horizontally diametrically opposite the adjusting device and comprises an arresting screw on the inner mounting, and a clamping member threadedly engaged by the arresting screw and clampingly engageable against the outer mounting upon tightening of the arresting screw.

Advantageously the clamping member is positioned to be braced between the mountings upon tightening of the arresting screw.

Alternatively, the arresting screw can carry an eccentric which, upon rotation of the screw, can press against the inner surface of the outer mounting.

The inner mounting can be formed at the front end thereof with an axially-extending bore rotatably receiving a shank of the screw, the screw extending rearwardly into an annular recess formed on the inner mounting, the outer mounting having an inner recess axially overlapping the annular recess of the inner mounting, the clamping member being provided in a space formed by the recesses.

The clamping member is formed with a forward flank inclined to an optical axis of the attachment and engageable with a correspondingly inclined flank of said inner mounting.

By providing the means for shifting the inner mounting within the outer mounting to one side horizontally of the cylindrical lenses which have their major dimensions vertically rather than horizontally, we are able to accommodate this means along a side of the lens system which is not utilized for the projection process. The clamping device can likewise be accommodated in the axial elongation of the inner mounting but horizontally to the opposite side of the projection.

The invention thus utilizes the fact that the lens systems are received in a cylindrical mounting but are themselves not axially symmetrical or circular but rather are elongated vertically and foreshortened horizontally to provide space horizontally to either side for the actuating or shifting means and the clamping means.

The enlargement of the lens diameter in the vertical direction by comparison with the shortened lens diameter in the horizontal direction results in a significant reduction of coma and improvement in the imaging efficiency, especially at the corners of the projected picture. As a result, the anamorphotic attachment of the invention permits imaging efficiencies to be obtained which hitherto could only be obtained with anamorphotic attachments of far more expensive constructions and larger dimensions.

The arrangement of the shifting and arresting screws horizontally diametrically opposite one another and so that these screws pass through the sheet metal or plastic segments forming flanging connectors hold the front lens in place, ensures that these screws can be manipulated at the front of the lens system while nevertheless protecting the screws against impact.

The adjustment of the inner mounting within the outer mounting while enabling the display on the outer mounting of a scale indicating the focus position of the inner mounting also ensures that the inner mounting will be fully enclosed within the outer mounting in all positions. This, of course, guarantees effective guidance of the movable inner mounting with a minimum of possible tilting of the two mountings relative to one another.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
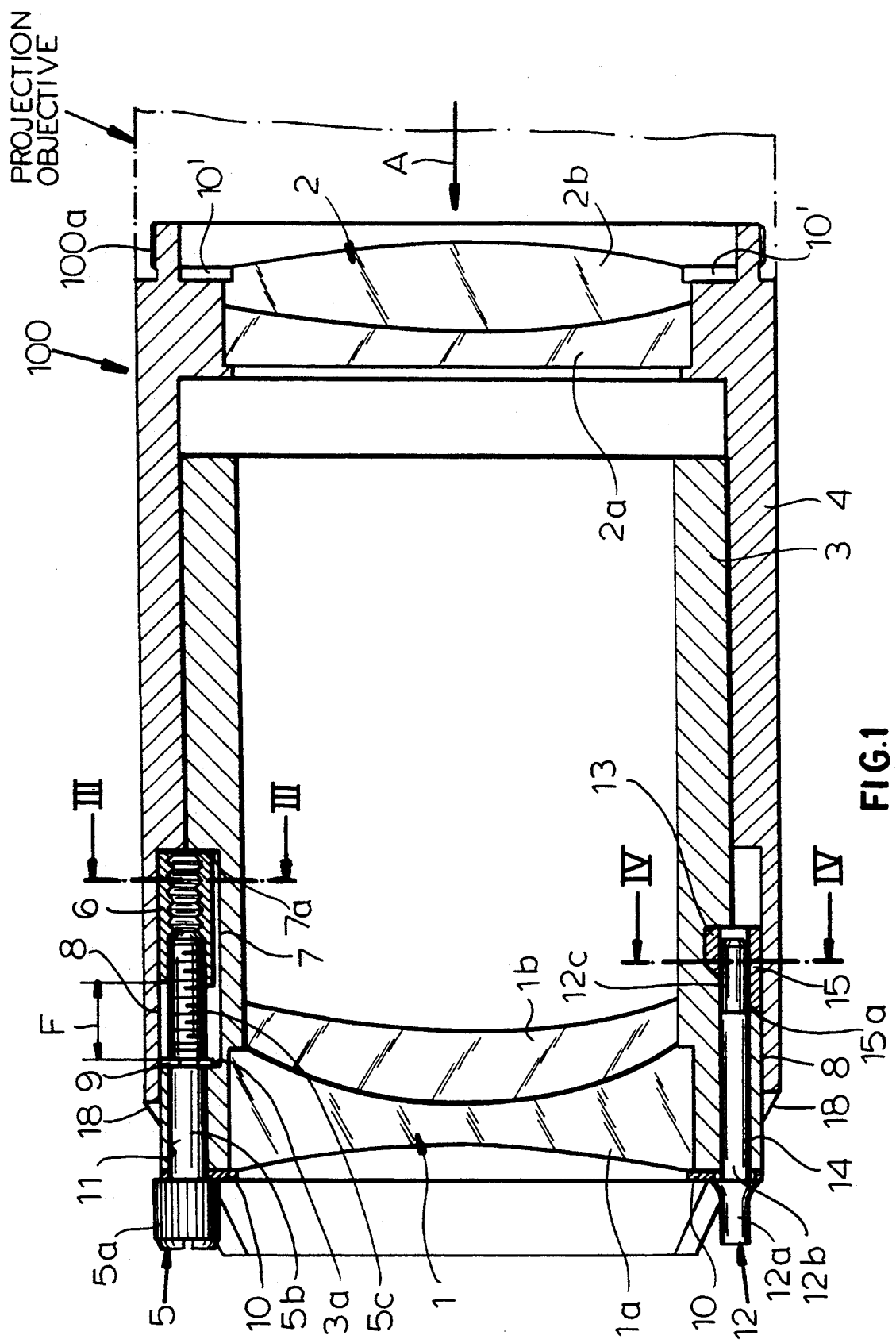
FIG. 1 is an axial cross sectional view through an anamorphotic attachment for a projection objective lens system and shown in a scale larger than true.
Figure 1A:
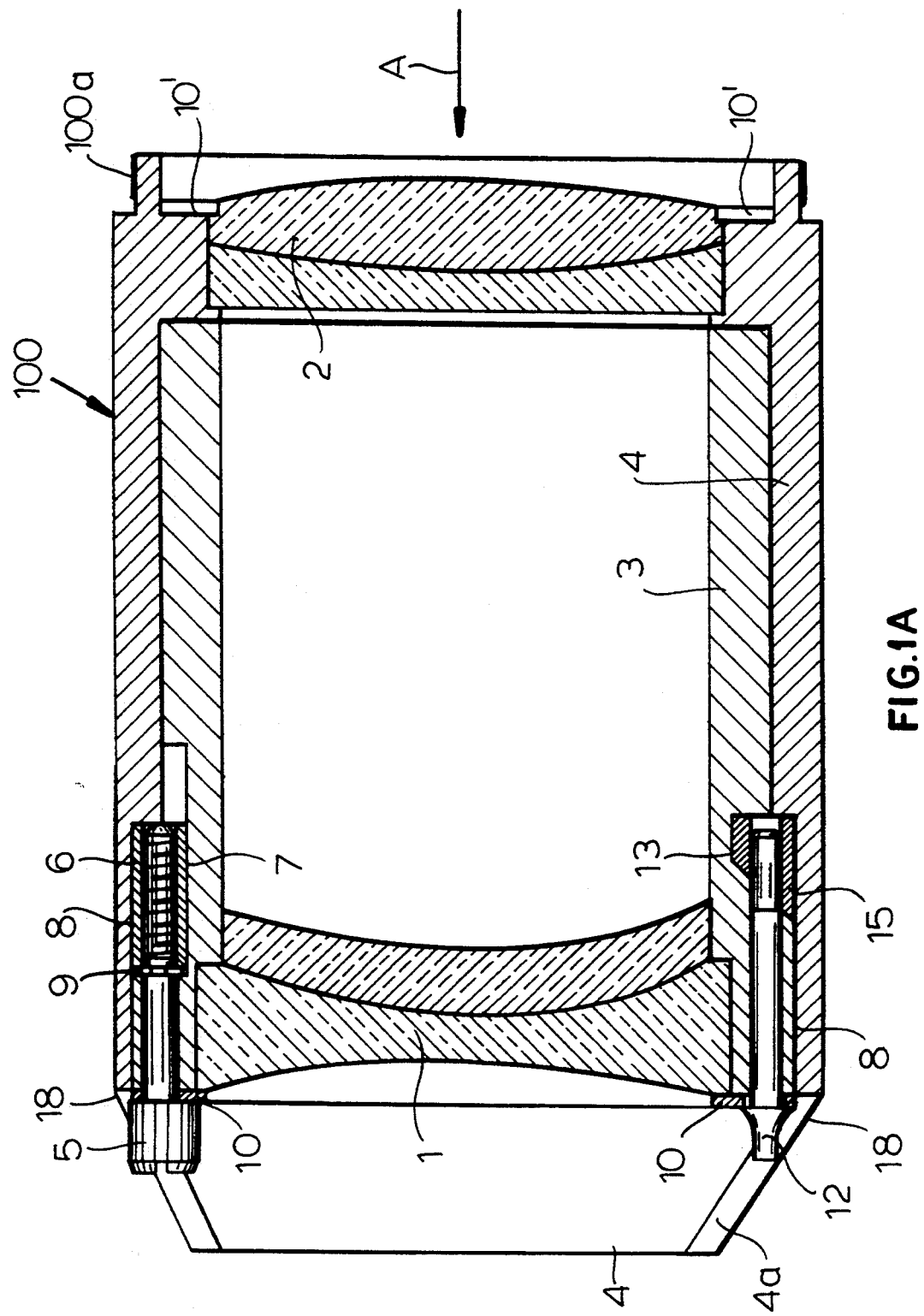
FIG. 1A is a view similar to FIG. 1 but illustrating the inner member of the attachment in an opposite extreme position from that of FIG. 1.

In FIGS. i and 1A, the arrow A represents the direction in which a light arrives from the projection apparatus through the projection lens or objective, and to which the attachment 100 of FIGS. 1 and 1A can be affixed by a screw thread 100a at the right hand end of the outer tube 4 of this attachment.

The attachment 100 is an anamorphotic attachment which is located between that projection of objective lens and the projection wall which is toward the left in these FIGS. and has not been illustrated.

The anamorphotic attachment of FIGS. I and 1A comprises a set 1 of two cylindrical lenses 1a and 1b which are cemented together and are located at the front end of the attachment, the lens 1a and 1b which are cemented together and are located at the front end of the attachment, the lens 1a being a double-concave lens and the lens 1b being a convex 0-concave lens.

The second set 2 of lenses 2a and 2b, also cemented together forms the rear lens group. The cylindrical lenses 2a and 2b consist of a plano-concave lens 2a and a double convex lens 2b, respectively.

The front optical component or lens group i is, as is known, mounted in the interior of an inner hollow cylindrical mounting or tube 3. The rear optical component or lens group 2 is also mounted in a hollow cylindrical mounting 4 forming an outer cylindrical member and the outer housing tube of the anamorphotic attachment. The outer diameter of the inner tubular mount 3 and the inner diameter of the outer tubular mount 4 are at least partly so selected that the inner tubular mount 3 is axially shiftable in the outer tubular mount 4 in a telescoping manner.

At an upper part of FIGS. 1 and 1A, which represent horizontal sections through the attachment, the displacement screw 5 is visible.

The screw 5 has a milled head 5 to which a shank 5b is affixed. At the midpoint of this shank, a split ring 9 is received in a corresponding groove of the shank 5b which is provided with a threaded portion 5c, threadedly engaged in a tubular nut 6.

The screw 5 extends from the middle of its shank to its rear shank end within a space defined between the inner mounting tube 3 and the outer mounting tube 4 and formed by an outer recess 7 of the inner mounting tube 3 and a concentric rotationally semicircular inner recess 8 turned in the inner wall of the outer mounting tube 4 at a front end thereof. The ring 9 is braced axially against the rearwardly facing flank 3a of the mounting tube 3 and hence against the latter.

Figure 2:
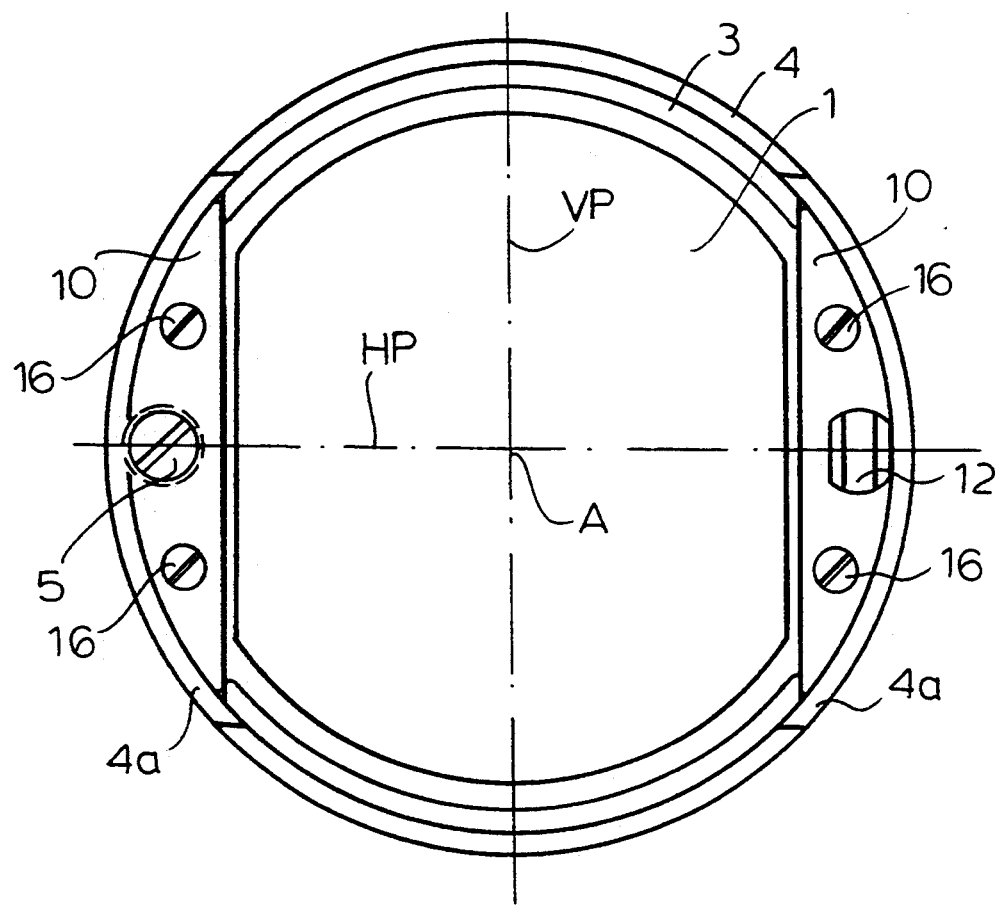
FIG. 2 is a front view of the anamorphotic attachment of the invention as shown from the projection wall.

The smooth portion of the shank between the head 5a and the ring 9 is freely rotatable in a bore 11 at the front end of this mounting tube and the head 5a lies against one of a pair of lens holder members 10 which are of circular segment shape and can be formed by an elastic aluminum sheet metal or synthetic resin members as illustrated in FIG. 2.

The members 10 are affixed by screws 16 to the front end of the tubular holder or mount 3 and retain the lenses 1a and 1b in place while providing a seat at the front end of the mounting 3 for the head 5a. The members 10 thus overhang the edges of the front lens 1a.

The rear end of the screw 5 has an external thread which, as noted, is screwed into the internal thread of the nut 6 and which is fastened to the outer tube 4 within the space defined between the recesses 7 and 8.

By actuation of the screw 5, its shank can be threaded more deeply into or out of the nut 6 to telescope the mounting tube 3 to the right or to the left within the tube 4.

In its forwardmost position illustrated in FIG. 1, further advance of the mounting tube 3 to the left is limited by the engagement of the rear wall 7a of the recess 7 against the rear of the nut 6 (See FIG. 1).

In the rearmost position of the mounting tube 3, further axial displacement is limited by the engagement of the ring 9 with the front end of the nut 6 as shown in FIG. 1A.

The stroke or maximum axial displacement of the mounting tube 3 within the tube 4 is therefore represented by the distance between the ring 9 and the nut 6 and as shown at F in FIG. 1.

The securing ring or split ring 9 is preferably formed as a washer which is seated in an annular groove in the central region of the shank of the screw 5. Between the head of the ring 9, the screw is axially locked to the mounting tube 3.

As will be apparent from a comparison of FIGS. 1 and 1A even in the forwardmost position of the inner mounting tube 3, it does not project axially beyond the outer mounting tube so that the maximum axial length of the anamorphotic attachment is only determined by the length of the outer mounting tube 4.

From FIG. 1 it can be further discerned that, in the front region between the front end of the inner tube 3 and the respective front walls of the recesses 7 and 13 in the inner mounting tube 3, the outer diameter of the inner mounting tube 3 is enlarged and thus can match the inner diameter of the front end of the outer mounting tube where the latter is formed with the aforementioned concentric rotationally symmetrical recess machined into the outer mounting tube 4 so that even in this region, the inner tube 3 is axially formfittingly telescoped in the outer mounting tube 4.

The rear optical component formed by the lens group 2 can also be held in place by a pair of overhanging lens holder members 10' which correspond to the elastic lens holder 10 at the front end for the front lens group 1. Alternatively, the rear lens group can be held in place by a washer-shaped or annular member.

At a lower portion of FIG. 1, the anamorphotic attachment is shown to have an arresting screw 12 which has a head 12a projecting from the front end of the inner mounting tube 3 and braced against the other lens holder member 10 and a shank or shaft 12 freely rotatable in the front end of the mounting tube 3 in an axial bore 14 thereof.

The shank of the screw 12 has a threaded portion 12c which threadedly engages an inner thread of a clamping member 15 which is segment-shaped and is formed with an inclined flank 15a engaging a corresponding flank on the inner mounting tube 3.

The clamping member 15 is locked in the recess 8 unless the screw 12 is tightened to draw the inclined surfaces against one another, the clamping member 15 is received with limited radial play between the inner mounting tube 3 and the outer mounting tube 4.

Should, however, it be desirable to fix the inner mounting tube 3 at a predetermined position within the outer mounting tube 4, the screw 12 can be rotated via its head to drive the shank of the screw 12 more deeply into the internal thread of the clamp member 15 and simultaneously press the inclined surfaces against one another, thereby camming the clamping member 15 outwardly against the outer mounting tube 4 in a wedge-like action and thereby lock the inner mounting tube 3 in place within the outer mounting tube 4. In practice, when the projection apparatus is operated, the screw 5 is used to displace the inner mounting tube 3 relative to the outer mounting tube 4 to compensate for the distance between the projection wall and the projector and provide the optimum focus position, whereupon the screw 12 is rotated to clamp the mounting tubes relative to one another. With this construction of the apparatus, the selected focus position is ensured for the entire projection process.

Lateral recesses 18 are provided at the front of the outer mounting tube 4 and are described in greater detail in connection with FIG. 5.

FIG. 2 is a front view of the anamorphotic. attachment of the invention seen from the direction of the projection wall and looking toward the projector and its objective. This view shows the arrangement of the displacement screw 5 and the arresting screw 12 diametrically opposite one another in the horizontal plane HP on opposite sides of the vertical median plane VP of the attachment and the optical axis A thereof. These screws are located in the outer lateral edge regions of the attachment. As a consequence, the heads of the screw 5 and the screw 12, or at least the portions thereof which can be engaged by the fingers for adjustment and locking or by a tool, if desired, are visible and accessible in cutouts for 4a in the forwardly projecting portions of the outer mounting tube 4.

The reference numerals 10 refer to the front lens holders which are in the form of sheet metal segments attached by screws 16 to the body of the inner lens mount 3 and which hold the front lens 1a in place against its seat.

As is also apparent from the front view of FIG. 2, the lenses of the front lens group 1, like the lenses of the second lens group 2, have their greater dimensions in the vertical direction and smaller dimensions in the horizontal direction.

Figure 3:
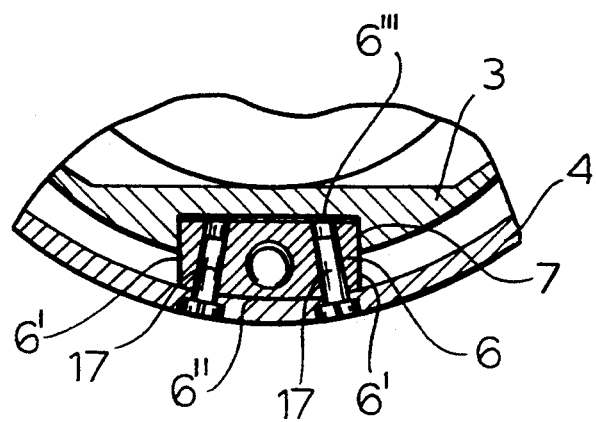
FIG. 3 is a partial section taken along the line III—III of FIG. 1 and through the nut of the displacement screw.

FIG. 3 shows a detail of the invention in section along the line III—III of FIG. 1, illustrating an embodiment of the nut 6 which can be affixed by screws 17 on the outer lens mounting tube 4 to project into the outer recess 7 of the inner mount 3 and in which a centrally threaded bore is provided to receive the threaded portion of the screw 5 (FIGS. 1 and 1A).

The nut 6 has, in cross section, two parallel surfaces 6' with which it rests against the flanks of the recess 7, and a cylindrical outer surface 6" conforming to and engaging the inner surface of the outer tube 4 and a planar surface 6''' located with play in the recess 7.

Figure 4:
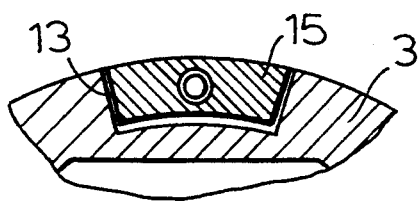
FIG. 4 is a partial cross section taken along the line IV—IV of FIG. I through the arresting screw and clamp member.

FIG. 4 illustrates another detail of the attachment in a section along the line IV—IV of FIG. 1, in which an embodiment of the clamping member 15 is located in the outer recess 13 of the inner mounting tube 3 and has a threaded bore centrally engaged by the threaded portion of the clamping screw 12 (FIGS. I and 1A).

Figure 5:
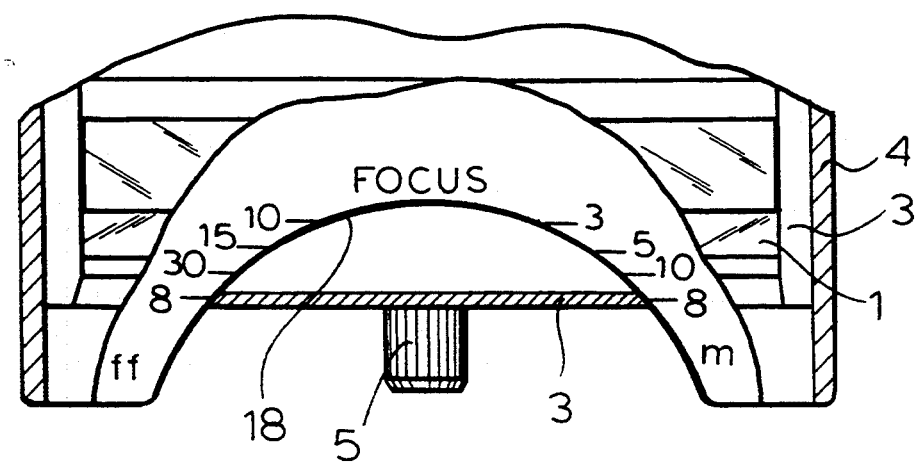
FIG. 5 is a side elevational view partly in section through the anamorphotic attachment showing the side of the attachment oriented toward the projection wall.

From FIG. 5, which is a side view from the direction of the arresting screw to the diametrically opposite displacement screw 5 and is partly broken away in a longitudinal section through the front end of the attachment, it can be seen that the cutouts 4a are in the form of semicircular recesses 18 which are concave forwardly. The screw 5 can thus be accessible to the fingers or to a tool and can be provided with a scale as shown in FIG. 5 to illustrate the focus position of the inner mounting tube 3 relative to the outer mounting tube.

The scale runs from 3 m or 10 feet to infinity. The arresting screw 12 can also be laterally engaged through the respective cutout or recess. Because of the ready accessibility, the clamping screw 12 can be loosened and the adjusting screw 5 rotated with a minimum of delay.

FIG. 5 also shows that throughout the full range of focusing positions of the inner mounting tube 3, it never projects beyond the outer mounting tube 4 so that the overall length of the attachment remains that of the outer mounting tube 4 in spite of the axial mobility of the inner mounting tube, and the outer mounting tube protects the inner mounting tube against impact.

Since, as was apparent from FIG. 2, the lenses have their greater dimensions running vertically, the space available with the cylindrical configuration laterally of these lenses can be effectively utilized to accommodate the means for arresting the mounting tubes, namely, the screw 12 and the clamping member 15, and the means for moving the inner tube, namely the screw 5 and the nut 6.

These means also lie within the outer mounting tube 4 and need not project radially or otherwise therefrom. Providing the mounting and clamping mechanisms diametrically opposite one another also precludes interference between them and enables them to be utilized in an optimum way.

As has been described for the flexible sheet metal or plastic members 10, another pair of circular segmental members 10' can be provided at the rear to hold the second or rear lens group 2 in place on the inner mounting tube 3.

The fact that the members 6 and 15 engage in both inner and outer recesses or grooves, allows the nut and the clamping member to key the inner mounting tube 3 in the mounting tube 4 against relative rotation. This also ensures that the lens groups will be properly oriented with respect to the vertical plane and distortion is thereby avoided as are uncontrolled azimuthal movements. The engagement of the flanks of the nut 6 in the recess 7 ensures formfitting interengagement thereof.

When the arresting screw 12 is tightened, the inner mounting tube 3 and the outer mounting tube 4 are so blocked against one another that rotation of the screw 5 is also precluded and accidental rotation of this screw cannot occur and will not displace the inner tube out of the preselected focusing position.

The head of the arresting screw 12 can be given a flat vane shape as shown to facilitate its rotation or can be provided with a slot for a screwdriver or other tool or provided with a milled periphery like the screw 5.

Figure 6:
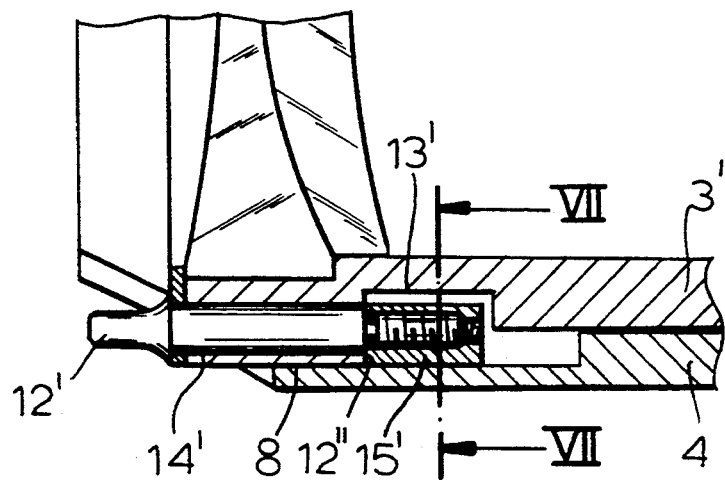
FIG. 6 is a partial section showing a variant of the screw and clamping member.
Figure 7:
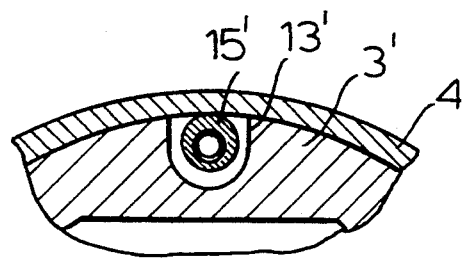
FIG. 7 is a section taken along the line VII—VII of FIG. 6.

FIGS. 6 and 7 show a variant of the structure of FIG. 1 in which the clamping member 15', as is especially apparent form FIG. 7, formed as an eccentric. In this case, member 12 is a screw threaded into the eccentric and adapted to rotatably entrain it and has its shank freely rotatable in an axial bore 14' in which it is formfitting and provided in the inner mounting tube 3'.

The eccentric 15' extends into a compartment formed between an outer recess 13' of the inner tube 3' and an inner recess 8 of the outer mounting tube 4.

The screw 12' has a shoulder 12" seated against the front end of the eccentric 15'. Solder or an adhesive may additionally secure the eccentric to the screw at the shoulder.

Thus, when the inner mounting tube 3' is to be clamped in position, the member 12' need only be rotated sufficiently to press member 15' against the inner surface of the outer mounting tube 4. The shaft of screw 12' and the bore 14' in the embodiment of FIGS. 6 and 7 to form the shoulder may have a larger diameter than the threaded portion of the screw 12' and may be slightly greater than the diameter of the shaft and bore of the embodiment of FIG. 1.

We claim:

1. An anamorphotic attachment for a projection objective, comprising:
    a fixed outer elongated tubular mounting provided with means for affixing said outer tubular mounting to said projection objective at a rear end of said outer tubular mounting;
    an axially movable inner tubular mounting telescopingly received in said outer tubular mounting, axially shiftable relative to said outer tubular mounting and extending substantially to a front end of said outer tubular mounting;
    a front lens group mounted in said inner tubular mounting at a front end thereof and a rear lens group mounted in said outer tubular mounting at said rear end thereof and forming with said front lens group an anamorphotic projection system; and
    means received in a lateral region of said inner mounting and axially coupling said mountings while being actuatable at a front side of the attachment for shifting said inner tubular mounting in said outer tubular mounting.

2. The anamorphotic attachment for a projection objective defined in claim 1 wherein said means for shifting includes a device received in said inner mounting and effecting an axial displacement upon rotation of an element of said device.

3. The anamorphotic attachment for a projection objective defined in claim 2 wherein said device includes a screw on said inner mounting having a shank with an external screwthread and an internal screwthread on said outer mounting for receiving said external screwthread.

4. The anamorphotic attachment for a projection objective defined in claim 3 wherein said internal screwthread is formed on a nut fixed on said outer mounting.

5. The anamorphotic attachment for a projection objective defined in claim 4 wherein said inner mounting is formed at the front end thereof with an axially extending bore rotatably receiving a shank of said screw, said screw extending rearwardly into an annular recess formed on said inner mounting, said outer mounting having an inner recess axially overlapping said annular recess of said inner mounting, said nut being provided in said inner recess.

6. The anamorphotic attachment for a projection objective defined in claim 4 wherein said screw is axially fixed to said inner mounting by a securing ring engaging an axially central region of said screw.

7. The anamorphotic attachment for a projection objective defined in claim 4 wherein said screwthreads are formed as mutually tightly interfitting screwthreads.

8. The anamorphotic attachment for a projection objective defined in claim 1, further comprising an arresting device for securing said inner mounting in said outer mounting at a selected focussing position of the attachment.

9. The anamorphotic attachment for a projection objective defined in claim 8 wherein said arresting device comprises an arresting screw on said inner mounting, and a clamping member threadedly engaged by said arresting screw and clampingly engageable against said outer mounting upon tightening of said arresting screw.

10. The anamorphotic attachment for a projection objective defined in claim 9 wherein said clamping member is positioned to be braced between said mountings upon tightening of said arresting screw.

11. The anamorphotic attachment for a projection objective defined in claim 10 wherein said clamping member is formed with an internal screwthread and said screw has an external screwthread engaged in said internal screwthread.

12. The anamorphotic attachment for a projection objective defined in claim 11 wherein said inner mounting is formed at the front end thereof with an axially extending bore rotatably receiving a shank of said screw, said screw extending rearwardly into an annular recess formed on said inner mounting, said outer mounting having an inner recess axially overlapping said annular recess of said inner mounting, said clamping member being provided in a space formed by said recesses.

13. The anamorphotic attachment for a projection objective defined in claim 12 wherein said clamping member is received between an outer surface of asid inner mounting and an inner surface of said outer mounting when said screw is loosened.

14. The anamorphotic attachment for a projection objective defined in claim 9 wherein said clamping member is formed as a nut for said screw.

15. The anamorphotic attachment for a projection objective defined in claim 14 wherein said clamping member is formed with a forward flank inclined to an optical axis of the attachment and engageable with a correspondingly inclined flank of said inner mounting.

16. The anamorphotic attachment for a projection objective defined in claim 9 wherein said arresting device is located at one horizontal side of said attachment and is located to one side of an optical axis thereof.

17. The anamorphotic attachment for a projection objective defined in claim 16 wherein said means for shifting are located at an opposite horizontal side of said attachment diametrically opposite said arresting device.

18. The anamorphotic attachment for a projection objective defined in claim 8 wherein said arresting device comprises an eccentric and means for rotating said eccentric.

19. The anamorphotic attachment for a projection objective defined in claim 18 wherein said inner mounting is formed at a front end thereof with an axially extending bore, said means for rotating said eccentric including an arresting screw having a head projecting forwardly of said inner mounting, a shank rotatably received in said bore, and a thread received in said eccentric, said arresting screw having a shoulder axially braced against said eccentric, said eccentric extending into a compartment formed between an outer recess in said inner mounting and an annular recess formed in said outer mounting.

20. The anamorphotic attachment for a projection objective defined in claim 1 wherein said means for shifting are located at one horizontal side of said attachment.

21. The anamorphotic attachment for a projection objective defined in claim 1 wherein said outer mounting projects axially forwardly beyond said inner mounting in all axially positions of said inner mounting.

22. The anamorphotic attachment for a projection objective defined in claim 4 wherein said front end of said outer mounting is forwardly concave.

23. The anamorphotic attachment for a projection objective defined in claim 22 wherein said front end of said outer mounting has two diametrically opposite forwardly concave lobes.

24. The anamorphotic attachment for a projection objective defined in claim 23 wherein said concave lobes have recesses accommodating said means for shifting and an arresting device for clamping said inner mounting relative to said outer mounting.

25. The anamorphotic attachment for a projection objective defined in claim 24 wherein said outer mounting is formed with a distance scale along one of said recesses in one of said lobes.

26. The anamorphotic attachment for a projection objective defined in claim 25 wherein said distance scale is located so as to cooperate with a front end of said inner mounting which indicates focus location along said scale, 27. The anamorphotic attachment for a projection objective defined in claim 1, further comprising a pair of elastic flange connectors securing said first lens group on said inner mounting.

28. The anamorphotic attachment for a projection objective defined in claim 27, further comprising another pair of elastic flange connectors securing said second lens group on said outer mounting.

29. The anamorphotic attachment for a projection objective defined in claim 28 wherein said flange connectors are circular segments of sheet metal or plastic.

30. The anamorphotic attachment for a projection objective defined in claim 29 wherein said connectors are secured by axially extending screws to the respective mountings.

* * * * *